US011917048B2

(12) United States Patent
Mallidi

(10) Patent No.: US 11,917,048 B2
(45) Date of Patent: Feb. 27, 2024

(54) METHOD OF ENABLING MANUAL SELECTION OF ALL POSSIBLE ATTRIBUTES OF ENCRYPTION

(71) Applicant: Venkata Raghu Veera Mallidi, Phoenix, AZ (US)

(72) Inventor: Venkata Raghu Veera Mallidi, Phoenix, AZ (US)

(*) Notice: Subject to any disclaimer, the term of this patent is extended or adjusted under 35 U.S.C. 154(b) by 427 days.

(21) Appl. No.: 16/170,070

(22) Filed: Oct. 25, 2018

(65) Prior Publication Data

US 2019/0199513 A1    Jun. 27, 2019

Related U.S. Application Data

(60) Provisional application No. 62/577,491, filed on Oct. 26, 2017.

(51) Int. Cl.
*H04L 9/06* (2006.01)
*H04L 9/08* (2006.01)

(52) U.S. Cl.
CPC ............ *H04L 9/0625* (2013.01); *H04L 9/088* (2013.01); *H04L 2209/34* (2013.01)

(58) Field of Classification Search
None
See application file for complete search history.

(56) References Cited

U.S. PATENT DOCUMENTS

| 6,826,696 B1* | 11/2004 | Chawla | H04L 63/0815 713/168 |
| 7,003,118 B1* | 2/2006 | Yang | H04L 63/0485 370/393 |
| 8,345,876 B1* | 1/2013 | Sinn | H04L 9/0656 380/255 |
| 9,391,774 B1* | 7/2016 | Strauss | H04L 9/32 |
| 10,061,932 B1* | 8/2018 | Combs | H04L 9/0637 |
| 10,303,527 B1* | 5/2019 | Jones | G06F 9/542 |

(Continued)

*Primary Examiner* — Kaveh Abrishamkar

(57) ABSTRACT

A method which is obtained specifically by output oriented coding, making possible the maximum selection of encryption parameters used for encryption by systems using OpenSSL, however without compromising the integrity of the encryption by autogenerating some Attributes thereby making possible row wise encryption in a database and encoding (if encoding is required) on the database side. The method has to satisfy the conditions/restrictions mentioned herein [0054]. This Invention is related to today's information technology and communicating methodology where encryptions and encodings are being used. The present invention can be described as software that enables a method of encryption acting as an Enhanced security feature or a technique which will enable users to manually or automatically select encryption parameters thereby encrypting and securing data. The primary reason for development of this method is to enable the users to have control over their encryption settings or parameters increasing the privacy and security. The invention method or technique is nothing but making sure that user is in control of encryption attributes, Methods, Techniques depending on the security levels required for encryption rather than a program controlling them, but assisting the User.

1 Claim, 8 Drawing Sheets

(56) References Cited

U.S. PATENT DOCUMENTS

| | | | |
|---|---|---|---|
| 2003/0093694 A1* | 5/2003 | Medvinsky | G06Q 20/367 |
| | | | 726/6 |
| 2004/0267768 A1* | 12/2004 | Harjanto | H04L 61/1558 |
| 2005/0091265 A1* | 4/2005 | Rimer | G06F 9/4493 |
| 2007/0079140 A1* | 4/2007 | Metzger | G06F 21/6227 |
| | | | 713/189 |
| 2012/0246695 A1* | 9/2012 | Cameron | G06F 21/6218 |
| | | | 726/1 |
| 2015/0095648 A1* | 4/2015 | Nix | H04W 12/04 |
| | | | 713/170 |
| 2015/0295953 A1* | 10/2015 | Chen | H04L 63/20 |
| | | | 726/3 |
| 2015/0379286 A1* | 12/2015 | Nordback | G06F 21/6209 |
| | | | 713/165 |
| 2015/0382274 A1* | 12/2015 | Logvinov | H04L 47/13 |
| | | | 370/311 |
| 2016/0328211 A1* | 11/2016 | Nordholt | H04L 9/0852 |
| 2017/0093587 A1* | 3/2017 | Glisson | H04L 9/3268 |

\* cited by examiner

FIG. 1.0
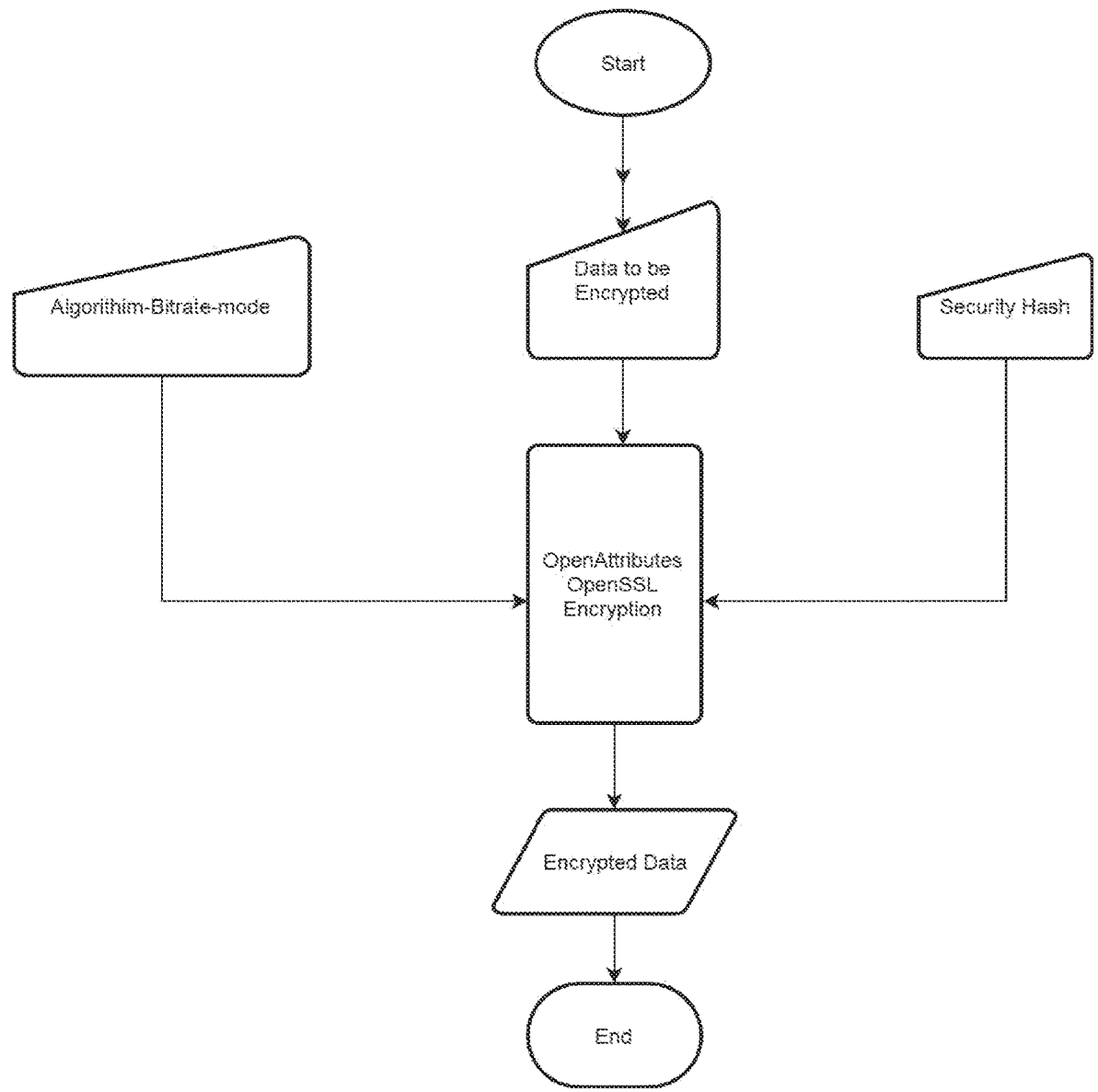

FIG 1.1
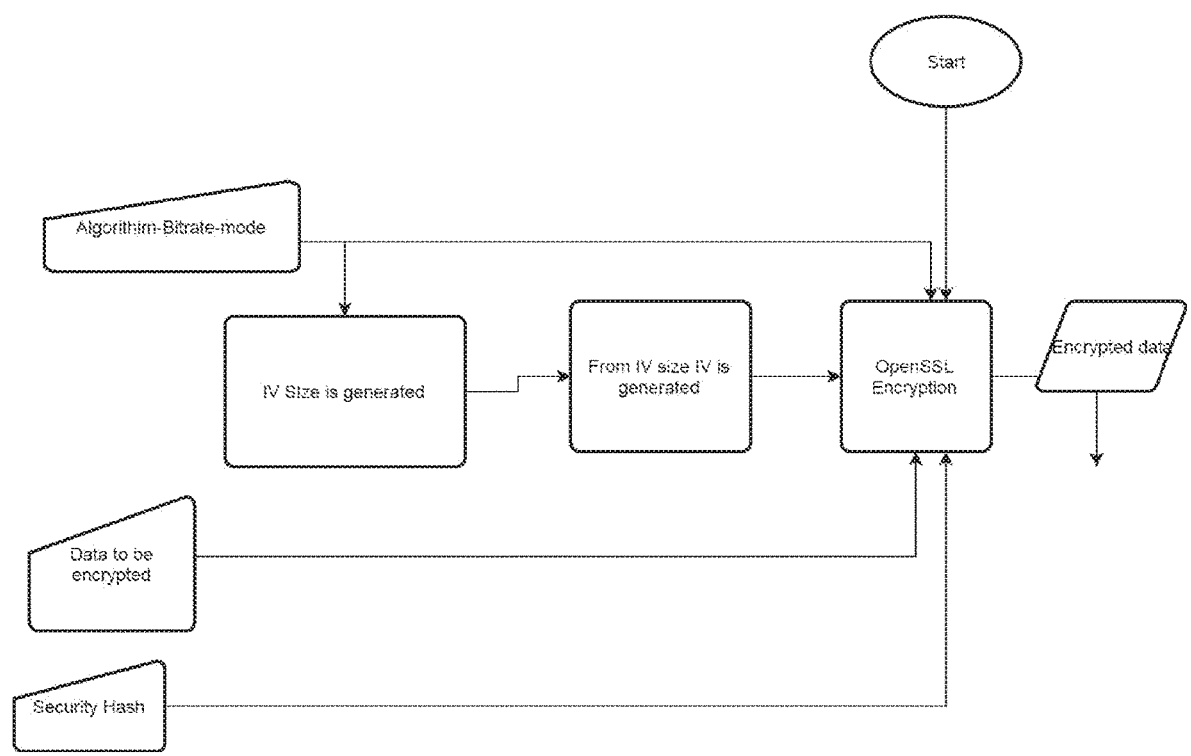

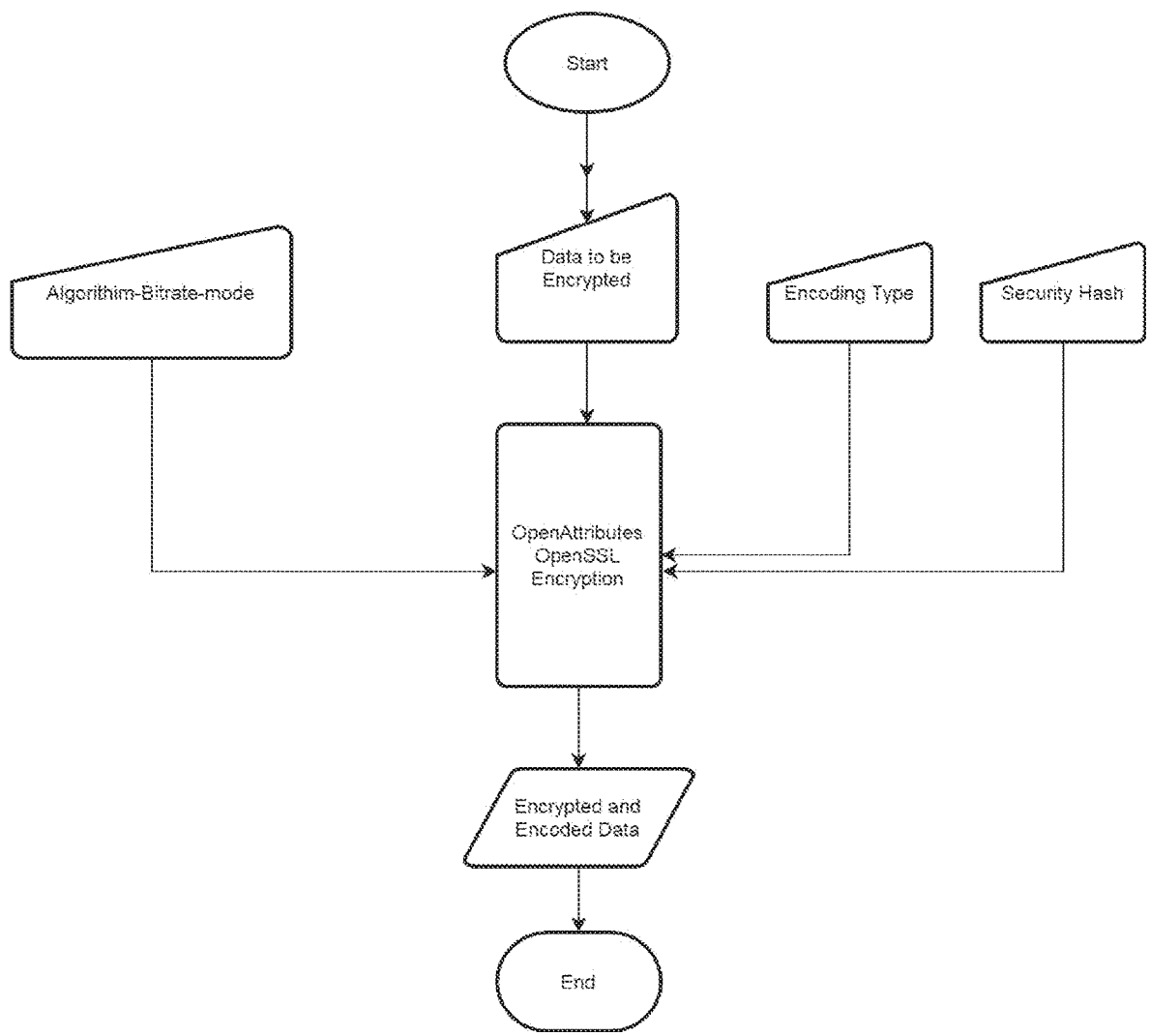
FIG. 2.0

FIG. 3.0
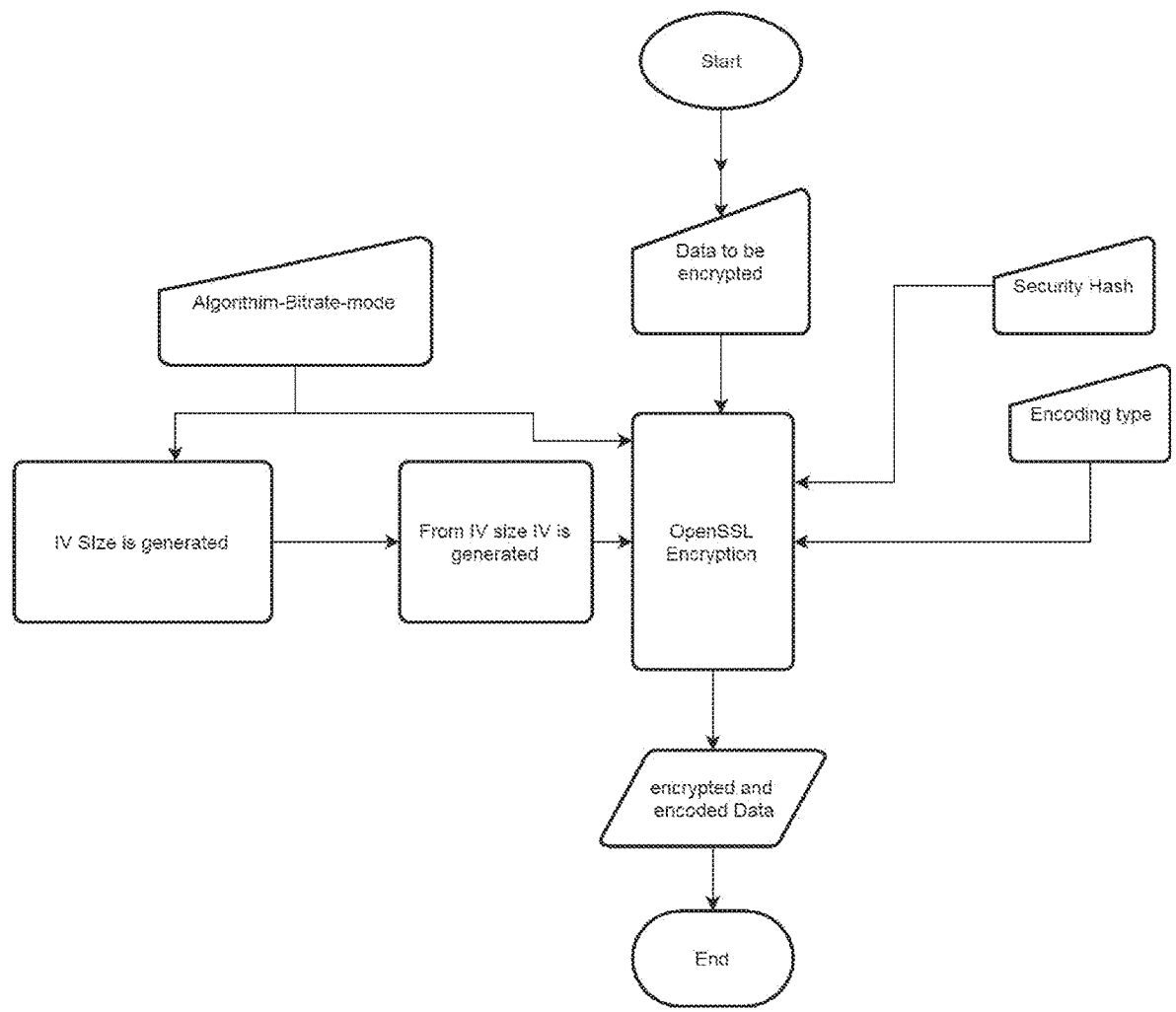

FIG.4.0
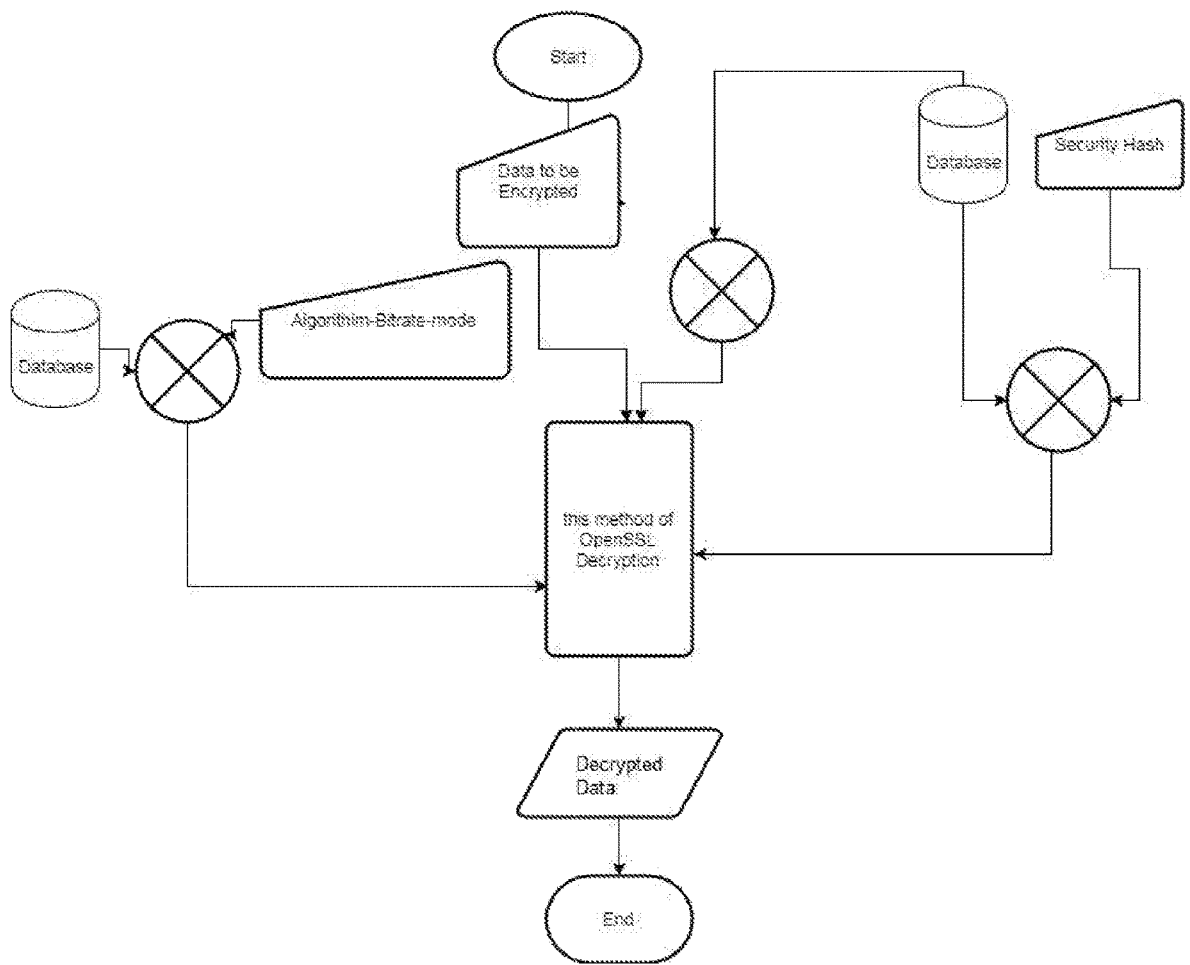

FIG.4.1
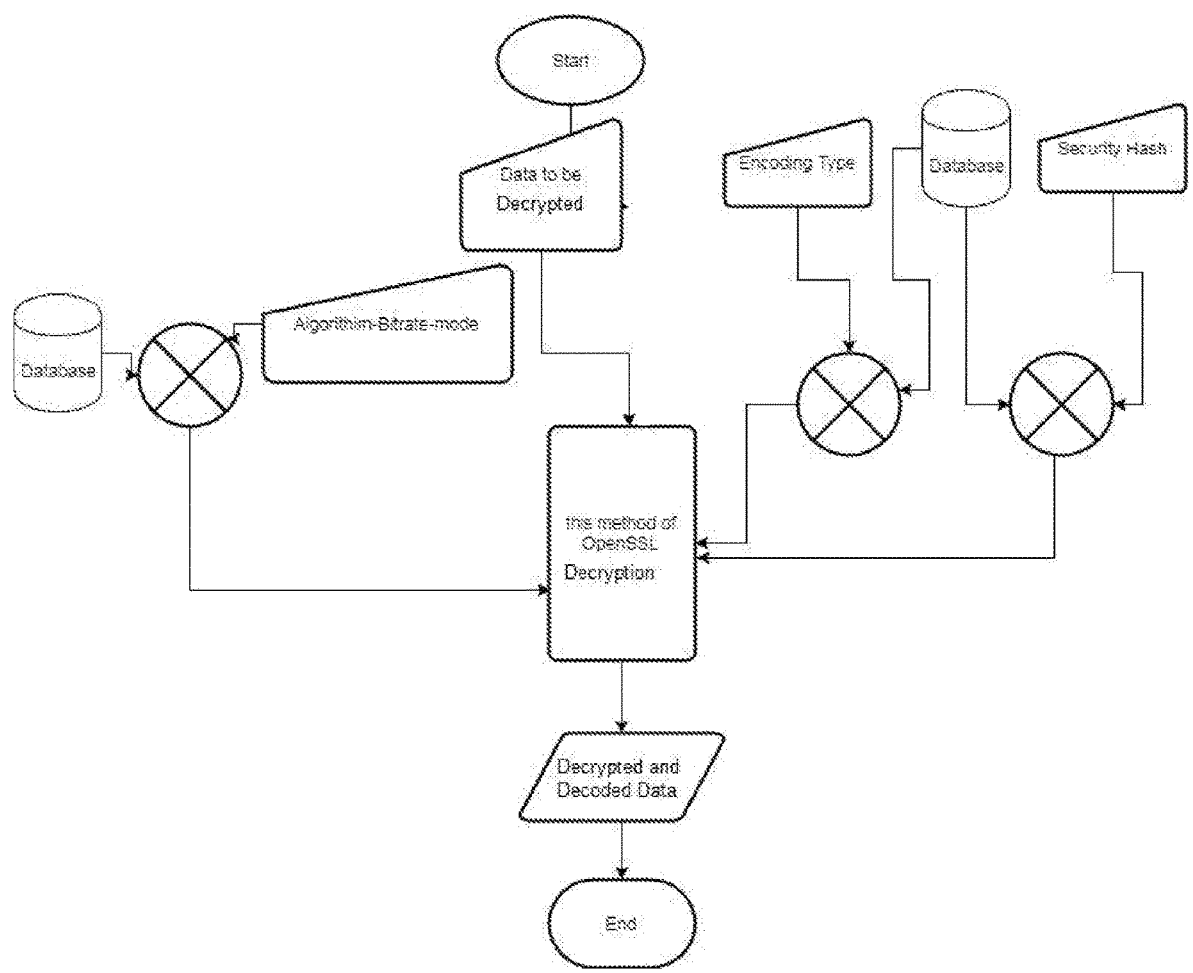

FIG.5.0
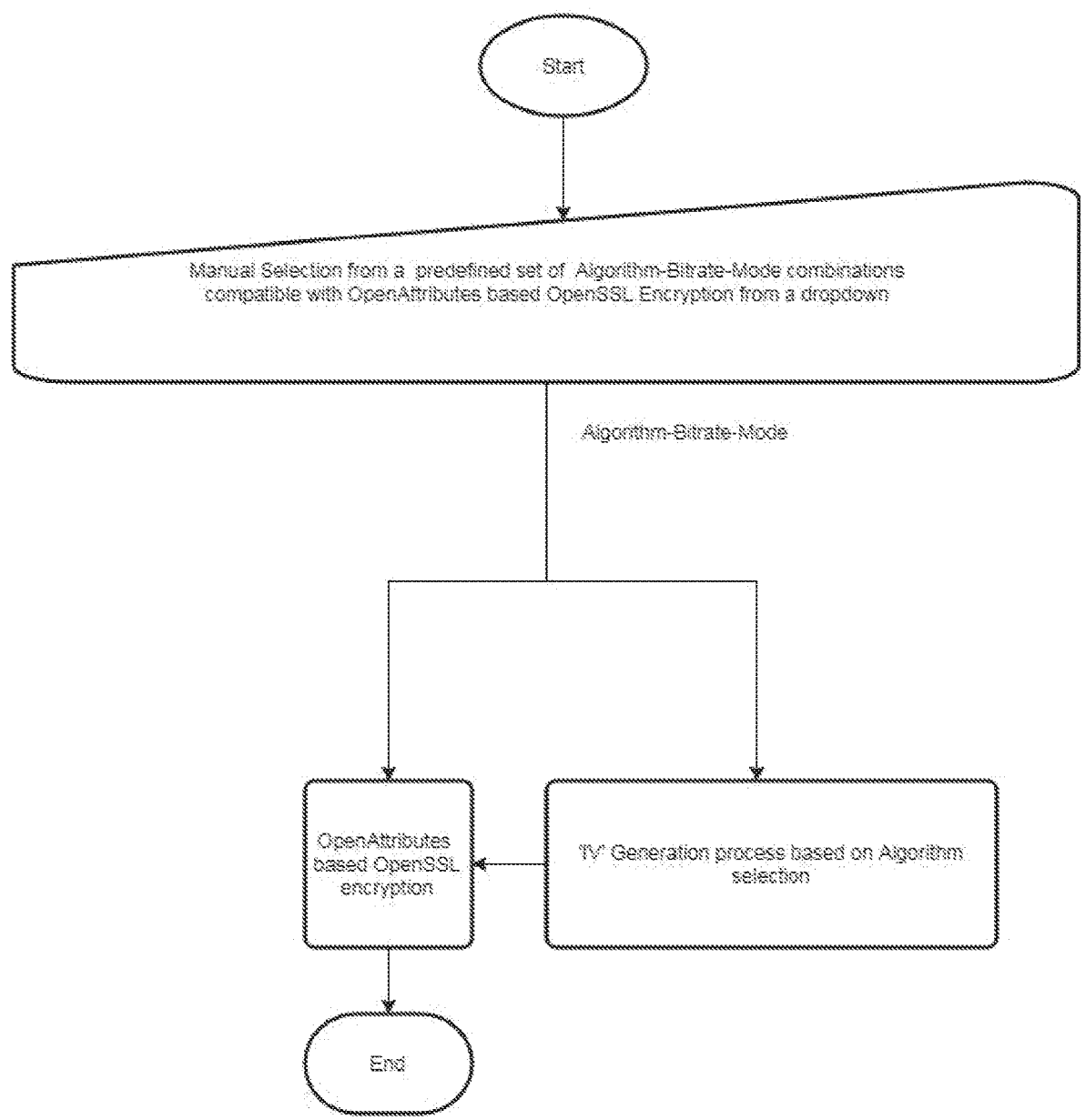

FIG.5.1
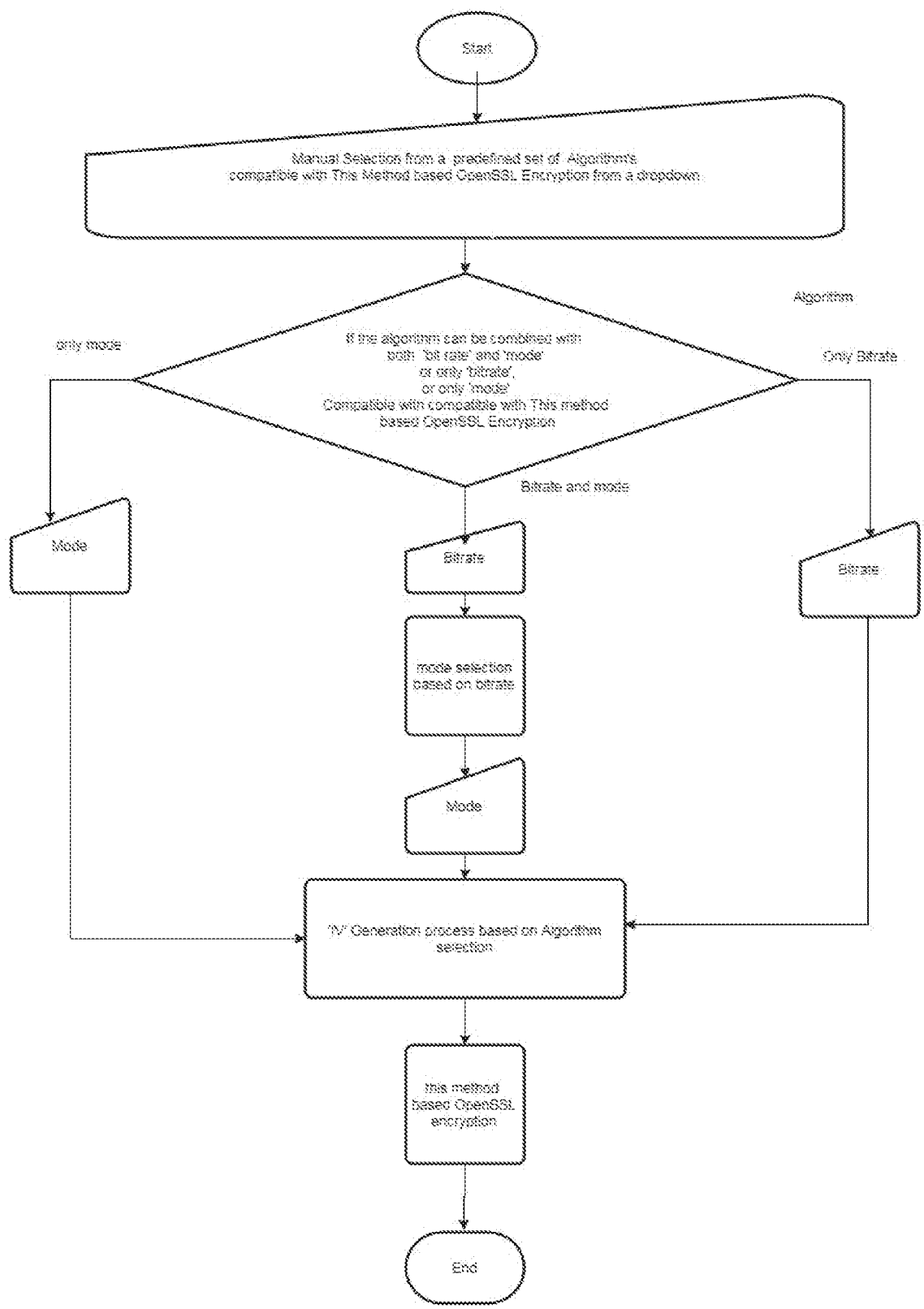

METHOD OF ENABLING MANUAL SELECTION OF ALL POSSIBLE ATTRIBUTES OF ENCRYPTION

CROSS REFERENCE TO RELATED APPLICATIONS

This application claims priority from U.S. Provisional Application No. 62/577,491 filed on Oct. 26, 2017, entitled "A METHOD OF ENABLING MANUAL SELECTION OF ALL POSSIBLE ATTRIBUTES OF ENCRYPTION", the content of which is incorporated by reference herein in its entirety.

BACKGROUND OF THE INVENTION

Field of the Invention

This Invention is related to today's information technology and communicating methodology where encryptions and encodings are being used. The present invention can be described as software that enables a method of encryption acting as an Enhanced security feature or a technique which will enable users to manually or automatically select encryption parameters thereby encrypting and securing data. Further-more doors can be opened for users to try new techniques which can be derived out of this methodology by trying out different permutations and combinations of made available encryption attributes to improve information security and discover new ways of encrypting there by securing the sensitive information over information and communication systems.

To be more specific the present invention is a method or a technique which can be implemented as a feature or administered as a method that can be used in present day information and communication systems where data is present hence providing security.

Encryption is a way to hide the actual content of a message by converting it into a non-understandable format. Attributes or ingredients for an OpenSSL encryption.

Encryption attributes in Open SSL are
1) Algorithm
2) Bitrate
3) Mode
4) Security Hash
5) IV initialization Vector
6) IV size
7) Encoding type (not exactly an attribute but can be implemented for data storage)

BACKGROUND OF THE INVENTION

Description of the Related Art

Prior art or current state of Art: Most of current day information and communications systems which constitute of data and databases already provide security features by adding Encryption, Encoding and some Applications may even let users to add a User defined security key or define a security key which is needed to read the message or decrypt which makes it more secure. Encryption, encoding techniques are not new to today's Information and Communication systems.
However the below two cases may show opening of the attributes however still limited.

Case 1: Attributes like 'Algorithm', 'Bitrate', 'Mode', 'Security Hash' are predefined and hardcoded by either the programmer or database administrator or whomsoever who controls the data. hence cannot be varied by the user.

Case 2: Attributes like 'Algorithm', 'Bitrate', 'Mode' are predefined and hardcoded by either the 'programmer' or 'database administrator' or whomsoever who controls the data. hence cannot be varied by the user. however, in some information and communication system's the attribute 'security hash' is made open for the user to define.

Possible Reasons why the attributes are predefined and not Open or Partially Open
a) The user may or may-not use encryption.
b) The user may select weaker encryption parameters.
c) The 'Initialization Vector (IV)' could not be selected properly to ensure the integrity of the total encryption remains uncompromised.
d) The security hash or key is predefined and made sure by the administrators of the data that it is complex enough.
e) Control over data in a Information or Communication System.
f) Total Database encryption with one specific set of parameters would not be possible.
g) Organizational Policies.

SUMMARY

The present invention is a software which will enable the maximum selection of encryption parameters used for encryption by systems using OpenSSL, however without compromising the integrity of the encryption by autogenerating some Attributes thereby making possible 'row wise encryption' on the database side. This software can also be termed as a 'method' because of the process involved within.

The invention in another embodiment can be more elaborately described as a piece of software which will follow a set of rules thereby creating a method of selecting the 'Initialization Vector' when other encryption attributes can be selected manually by the user. The manually selectable attributes of this method are enabled in such a way where the combination of manually selectable attributes (Ex:—Algorithm-bitrate-mode combination), and autogenerated attributes involved in the encryption process never lose their integrity and therefore do not compromise the integrity of the encryption.

This method when applied for encryption purposes will enable the user to select Algorithm, Bitrate, Mode, Securityhash. The combination of these three attributes can be called as a set and 111 different sets that can be formed out of the present-day OpenSSL encryption technology available. however, there can be additions or removals of these algorithm-bitrate-mode combinations in OpenSSL as time progresses which is controlled by the administrators of the OpenSSL encryption technology publisher's.

Process of encryption and decryption where this method goes by

Encryption Process
Step 1. Manual selection of all selectable attributes 'Algorithm', 'Bitrate', 'Mode', and 'Security Hash'
Step 2. Auto generation of 'Initialization Vector (IV)'
Step 3. Encryption the message or data to be encrypted by using 'Algorithm', 'Bitrate', 'Mode', 'Security Hash', 'Initialization Vector (IV)'.
The entire method should support the mentioned conditions in [0054]

Decryption Process
Step 1. Manual selection or selection from a database table of all selectable attributes 'Algorithm', 'Bitrate', 'Mode', and 'Security Hash' including 'IV'

Step 2. Decryption the message or data to be encrypted by using 'Algorithm', 'Bitrate', 'Mode', 'Security Hash', & 'Initialization Vector (IV)'.

BRIEF DESCRIPTION OF THE DRAWINGS

FIG. 1.0 is a Flow chart diagram showing a generic process involved of the present invention where attributes of encryption are being supplied to 'this method' of encryption.

FIG. 1.1 is a Flow chart diagram showing a detailed description of the present invention where attributes of encryption are being supplied to this method of encryption and how the attributes are being processed for generating an 'IV'.

FIG. 2.0 is a Flow chart diagram showing a generic process involved of the present invention where attributes of encryption are being supplied to 'this method' of encryption where encryption and encoding the encrypted data.

FIG. 3.0 is a Flow chart diagram showing a detailed process involved of the present invention where attributes of encryption are being supplied to 'this method' of encryption and how the attributes are being processed for generating an 'IV' thereby encrypting and encoding the encrypted data.

FIG. 4.0 is a Flow chart diagram showing a process involved of the present invention where attributes of decryption are being supplied either from a database or manually to 'this method' where decryption takes place.

FIG. 4.1 is a Flow chart diagram showing a process involved of the present invention where attributes of decryption are being supplied either from a database or manually to 'this method' where decryption and decoding takes place.

FIG. 5.0 is a Flow chart diagram showing a process involved of the present invention where the user can select a set of 'Algorithm-bitrate-mode' as a dropdown set according to Method 1 stated at [0043].

FIG. 5.1 is a Flow chart diagram showing a process involved of the present invention where the user can select a set of 'Algorithm-bitrate-mode' by initially selecting an algorithm and depending on the algorithmic selection selecting a bit rate and mode according to Method 2 described at [0044].

DETAILED DESCRIPTION OF THE INVENTION

Term's Used:

Set: A term 'set' wherever used wherever means a combination of 'algorithm-bitrate-mode' sometimes the set could be without a 'bitrate' and 'mode'

Openattributes: A term used wherever within synonymous to "the method". Also referring to this invention further pertaining to this application.

This method: A term used wherever meaning this invention or this design or this process IV: A term used wherever referring to one of the Attributes namely 'Initialization Vector', of openSSL Encryption.

Attributes: A term used wherever referring to one of the components which further can be classified or described as input embodiments Ex: 'Algorithm-bitrate-mode', 'Initialization Vector', 'Securityhash', 'data' of openSSL Encryption.

Parameters: A term used wherever referring to which is synonymous to 'Attributes'

Variables: A term used wherever referring to which is synonymous to 'Attributes' or 'parameters'

Super user: A term used wherever referring to as someone who has full control over an entire relational database management system. A term used wherever referring to can also be called as 'Sys-Admin'

Introduction:

In Today's world of information systems and communication Data breaches have become common. Data breaches can be more classified as privacy breaches or total information leak by a hacker.

A. Privacy Breach

Privacy breach can be someone viewing someone else data. To easily understand this example should prove sufficient Ex:—A developer or a database administrator decrypting and looking into a Specific user's information like communication with other user's or the users Sensitive personal information stored in the database like name's SSN, phone number. This breach occurs either because of the users who are in control of data having 'Super user' privileges over the data.

B. Total Information Leak:

When a database gets hacked or completely stolen or completely viewed by a hacker. The information is completely out with the hacker.

Case 1: Encrypted Information leak. If the leaked-out information is already encrypted. The probability of the hacker to succeed is higher and may try different methods and may succeed at one point of time because of today's practices of encrypting the whole database with one set of Attributes or one key and certificate.

Case 2: Unencrypted information Leak. An unencrypted database or an information system is completely open and if stolen or looked into its obvious that there occurred a privacy breach and total information leak.

Hence to fight these problems of current day information and communication systems any kind of data currently implemented method of securing data is through encryption.

Generally, encryption contains different parameters, however not limited to 'Algorithm', 'Bitrate', 'Mode', 'security key' and 'encoding' (if encoding is required).

When OPEN SSL encryption is used the parameters (attributes) of encryption 'Algorithm', 'Bitrate', 'Mode', 'Security Hash' and 'Initialization Vector (iv)' are required to be defined for a secure encryption to be processed. It is to be advised that 'bitrate' and 'mode' are specific to the encryption type. In OpenSSL Encryption technology not, all algorithms have 'bitrate' and 'mode'. Some algorithms do not have a 'bitrate' and 'mode' Ex:—"rc4". While some have only 'mode' Ex:—"bf-cfb".

Predefining IV was one solution however that restricted the flexibility of changing the set of attributes. Predefining IV is an insecure way and can get compromised easily The present invention is a method which is obtained specifically by output oriented coding, making possible the maximum selection of encryption parameters used for encryption by systems using OpenSSL, however without compromising the integrity of the encryption by autogenerating some Attributes thereby making possible row wise encryption in a database and encoding (if encoding is required) on the database side.

This software in another embodiment can also be termed as a 'method' because of the process involved within. The invention can be more elaborately described as a piece of software which will follow a set of rules thereby creating a method of selecting the 'Initialization Vector' where other encryption attributes can be selected manually by the user. The manually selectable attributes of this method are enabled in such a way where the combination of manually selectable attributes (Ex:—'Algorithm-bitrate-mode' combination), and autogenerated attributes involved in the encryption process never lose their integrity and therefore do not compromise the integrity of the encryption and encoding.

In this method described of Encryption attributes like 'Algorithm', 'Bitrate', 'Mode', 'Security Hash' are opened for the user to be configured. This will allow the user to select 'Algorithm', 'Bitrate', 'Mode', 'Security Hash'. However still autogenerating the 'Initialization vector size' based on the Algorithm preselected by the user. From the 'ivsize' get produced the 'IV' which is further utilized as another attribute which is involved in encryption. The 'IV' once Generated can be displayed depending on the situation if required.

Upon research and testing when this method is used it is found out that of the present day existing 111 possible different combinations or sets only 81 stand good with this method without compromising the encrypted output here defined.

This method or software can be built from scratch into a new information and communication's system or can also be integrated into existing systems depending on the compatibility of the existing system or the new system.

The possibilities of this new methodology are endless as it opens new doors to security and privacy by different combinations and permutations of the attributes. This new methodology will also break the bathers of predefined security which can always be attacked and cracked. This methodology involves human interaction and can be easily integrated into existing and new applications.

Current day Privacy concerns can be addressed with this technology as it can be implemented by the users themselves instead of depending on the people who handle data because of attributes made open. The method or technique in another embodiment can also be described as a very flexible encryption tool that can be directly embedded into information and communication systems.

The method or technique in another embodiment can be further elaborated as making available of encryption attributes like 'Algorithm', 'Bitrate', 'Mode', 'Security Hash' open to be configured, however still autogenerating the Initialization vector size based on the Algorithm preselected by the user. From the 'ivsize' gets produced the 'IV' which is further utilized as another attribute which is involved in encryption.

Encoding, Decoding and its Importance

Encoding: Encoding an encrypted data is because of the reason where some database table have columns which may not support encrypted data Ex: If we consider some versions of MySQL or Maria DB the column datatype should be specified to 'Var-Binary' for supporting storage of encrypted data. Situations like those where Var-Binary is not available and only a 'varchar' or 'char' is the datatype we can encode the data and store it to the database.

Decoding is just the opposite process of encoding. Generally some situations where encrypted data needs to be stored into a database and as explained in [0040] it will be stored in encoded format because of the datatype compatibility issues as mentioned in [0040]. Hence there might be a need for decoding before decryption of data If encrypted and encoded as referred in [0060].

Process or procedure of the method of presentation of encryption parameters (attributes)
The process of encryption where this method goes by the following steps Step 1. Manual selection of all selectable attributes 'Algorithm', 'Bitrate', 'Mode', and 'Security Hash'.
This can be achieved by any of the two methods shown below
Method 1.
a) Step 1. The 'Securityhash' is always open for the user though out the method however the User will be able to select an algorithm from a dropdown list of algorithms which are tested to be compatible with this method but not all algorithms available in OpenSSL technology.
b) Step 2. Depending on the algorithm selected the user will be presented with more attributes like bitrate and mode which are tested to be compatible with this method but not all bitrates and modes available in OpenSSL technology.
c) Step 3. Now we have a 'algorithm-bitrate-mode' which is the output of user selection and also which is tested compatible with this method and a 'Securityhash' ready to be supplied
Method 2. In this method there would be two attributes to choose from one being a combination of 'algorithm-bitrate-mode' and the other being 'Securityhash'. The 'Securityhash' is always open for the user though out the method 2. The user would be presented with a dropdown from which the user would be able to select one option which is a set of 'Algorithm-Bitrate-Mode' out of all the combinations which are tested positive to work with this method and not all combinations possible with OpenSSL technology. Ex:— 'CAMELLIA-256-CBC'
Step 2. Auto generation of 'Initialization Vector (IV)'.
The Initialization vector is produced from the value of 'IV Size' which is further produced from the algorithm and not just a random value.
Step 3. Supply of variables.
Attributes or parameters namely 'Algorithm', 'Bitrate', 'Mode', 'Initialization Vector' and 'Security Hash' which are to be supplied to the encryption process are ready with 'the data to be encrypted' and can be supplied to the encryption process. It is advised that not just the encryption parameter's but also the 'encoding type' can also be supplied as a variable or attribute to this method for storage of encrypted data.
Step 4. Encryption
Encryption and or encoding the message or 'data to be encrypted' by using 'Algorithm', 'Bitrate', 'Mode', 'Security Hash', 'Initialization Vector (IV)' will be supplied to the encryption of OpenSSL technology and the processed returning the output either encrypted or encrypted and encoded.
Step 4. Encoding.
The possible encodings that can be applied for this method of encoding are 'hexadecimal' and 'base64'. Encoding can be implemented depending on the requirement so its optional and also dependent on the "encryption-bitrate-mode". Research and testing concluded that 81 set's work seamlessly while encrypting and encoding with 'hexadecimal' and 'base64' types of encoding.
It is to be noted that post encryption or encryption and encoding the data can be saved into a database depending on the system where this method is implemented.
Encoding: Encoding an Encrypted data is because of the reason where some database table have columns which may not support encrypted data as mentioned in [0040]
Decryption Process
Supply of Variables (Attributes)
Manual selection or selection from a database table of all selectable attributes 'Algorithm', 'Bitrate', 'Mode', and 'Security Hash' including 'IV' and also either encrypted or encrypted and encoded data to be decrypted Step 2. Decryption/Decryption and Decoding Decryption the message or data to be decrypted by using the supplied 'Algorithm', 'Bitrate', 'Mode', 'Security Hash', & 'Initialization Vector (IV)'. If at all the data is encrypted and encoded and saved, we should decode first and then decrypt. if encoding type is supplied then we need to decode depending on the encoding type as mentioned in [0060]

Restrictions or Conditions to be satisfied in ¬¬ this method to be secure.

The attribute's which are to be supplied as a set should satisfy the below conditions or else those set of attributes (parameters) will not be applicable to this method.

The uniqueness or non-obviousness of this method is that it should satisfy the following conditions and it does.
1. While attributes are open the attribute values (input variables) should be able to produce an IV size.
2. While attributes are open the attribute values (input variables) should be able to Produce an IV.
3. While attributes are open the attribute values (input variables) should be able to the encoding of the encrypted data in both base64 and hexadecimal.
4. While attributes are open the attribute values (input variables) should be able to the Decoding of the encrypted data in both base 64 and hexadecimal.
5. Open the attribute values (input variables) should be able to support Decryption and Decoding.

Research concludes that not all sets of attributes can be supplied to this method for encryption because they do not satisfy the conditions stated above.

Limitations: Limitations are to be disclosed because of the nature of the method to be proven non-obvious. Upon research and testing this method it is found that the number of combinations of 'Algorithm-Bitrate-mode' which possible out of this method over the encryption parameters are 111. however only 81 different "permutations and combinations" of 'algorithm-bitrate-mode' out of the 111-possible stand good with this method and rest Fail due to reasons like
a) no output
b) works fine
c) hexa encoding doesn't work
d) doesn't give output
e) error
f) decryption doesn't work.

While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this invention.

Research Involved: There has been a lot of research involved for developing this method because of the failure to perform and integrity being compromised when attributes are made open and not predefined. The whole Idea is to make available the maximum number of attributes without the integrity of the encryption being comprisable.

While trying to input variable without using this method to ordinary openSSL encryption, encrypted output was not secure. In order for the output to be secure 'IV' had to be predefined which restricted the flexibility of changing the algorithm hence there arouse a need to develop a few lines of software which will execute secure encryption hence was 'This Method' developed.

This method can be flexibly modified where we can perform

Encrypt and Encode and Decrypt and Decode encrypt and decrypt

I claim:

1. A method of OpenSSL encryption and encoding and OpenSSL decoding and decrypting comprising:
   encryption comprising:
      a user manually selecting a set of encryption attributes, wherein the encryption attributes comprise an algorithm, a bitrate, and a mode;
      the user providing a security hash;
      generating an Initialization Vector (IV) size based on the algorithm, bitrate, and mode combination set;
      generating an IV from a random value and the previously generated IV size;
      providing the encryption attributes, security hash and the IV to an encryption function in order to encrypt data;
      encoding the encrypted data which is output from the encryption function using a base64 or a hexadecimal encoding function;
   decryption comprising:
      decoding the encoded encrypted data based on the previously selected encoding function to obtain the encrypted data;
      providing the previously selected encryption attributes set to the decryption function;
      providing the previously selected security hash to the decryption function;
      providing the decoded encrypted data to the decryption function; and
      decrypting the decoded encrypted data by supplying the IV, the encryption attributes set, and the security hash to the decryption function.

* * * * *